Patented Feb. 28, 1950

2,498,665

UNITED STATES PATENT OFFICE 2,498,665

PREPARATION OF PEPTIDES

Oliver H. Emerson, Kensington Park, Calif., assignor to the United States of America as represented by the Secretary of Agriculture No Drawing. Application August 12, 1947,
Serial No. 768,254

13 Claims. (Cl. 260—112)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to peptides, that is, the combinations of two or more amino acids, the amino group of one acid being united with the carboxyl group of another, and has among its objects the provision of a process for the preparation of peptides. Other objects will be apparent from the description of the invention.

I have found that peptides can be prepared by a simple reaction giving good yields. To this end a phthalyl amino acid halide is coupled with an amino acid whereby a phthalyl peptide is formed. This compound is readily cleaved by the action of hydrazine to yield the peptide.

In another phase of the invention, the phthalyl amino acid halide is coupled with a peptide to yield a phthalyl peptide having one more unit than the peptide used as the raw material. This phthalyl peptide can likewise be cleaved by reaction with hydrazine to yield the peptide having the additional unit. The reactions can be illustrated by the following equations:

(A) Preparation of glycyl-glycine from phthalyl-glycyl chloride and glycine:

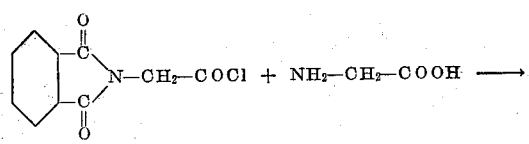

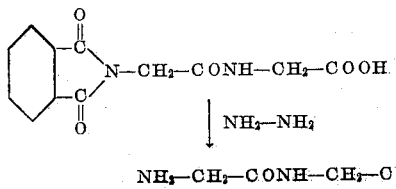

(B) Preparation of glycyl-glycyl-glycine from phthalyl-glycyl chloride and glycyl-glycine:

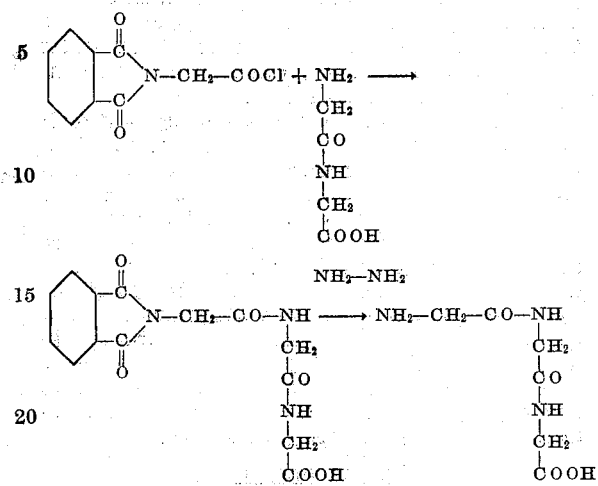

The following examples disclose particular steps and conditions within the scope of this invention, but it is to be understood that these examples are given only by way of illustration and not limitation.

EXAMPLE I

*Preparation of glycyl-glycine*

(A) *Preparation of the phthalyl-glycyl-glycine intermediate.*—A solution of 9.26 grams of phthalyl-glycyl chloride in benzene was added slowly with mechanical stirring to an ice cold solution of 3.1 grams of glycine and 8 grams of sodium bicarbonate in 50 cc. of water. The stirring was continued for about one hour after the addition of all the acid chloride. The benzene layer was removed and the aqueous solution acidified with hydrochloric acid to precipitate the crude phthalyl-glycyl-glycine. This product was recrystallized from 500 cc. of water and had a melting point of 229°–230° C. A yield of 7.87 grams (72% of theory) was obtained.

Analysis — Calculated for $C_{12}H_{10}O_5N_2$: N, 10.68%. Found, N, 10.62%.

(B) *Cleavage of phthalyl-glycyl-glycine.*— One gram of the phthalyl-glycyl-glycine, prepared as described above, was dissolved in 25 cc. of boiling water, 0.2 gram of hydrazine hydrate was added, and the mixture refluxed for half an hour. The solution was made acid to Congo red by the addition of hydrochloric acid and the by-product phthal-hydrazide filtered off. The filtrate was concentrated to a small volume, filtered again, and neutralized to methyl red with morpholine. Ten volumes of absolute alcohol were added slowly with stirring. The glycyl-glycine separated in crystalline form. It was identified by its crystal form and the crystal form of its hydrochloride. Melting point determination was not employed because glycyl-glycine has no definite melting point.

EXAMPLE II

*Preparation of glycyl-glycyl-glycine*

(A) *Preparation of the phthalyl-glycyl-glycyl-glycine intermediate.*—A solution of 9 grams of phthalyl-glycyl chloride in benzene was added slowly with mechanical stirring to an ice cold solution of 5.3 grams of glycyl-glycine and 7.4 grams of sodium bicarbonate in 50 cc. of water. The stirring was continued for about one hour after the addition of all the acid chloride. The benzene layer was removed and the aqueous solution acidified with hydrochloric acid to precipitate the crude phthalyl-glycyl-glycyl-glycine. This materal on recrystallization from water separated in beautiful crystals melting with complete decomposition at 238° C.

(B) *Cleavage of phthalyl - glycyl - glycyl-glycine.* — Phthalyl-glycyl-glycyl-glycine (1.25 grams), prepared as described above, was dissolved in 25 cc. of boiling water, 0.21 gram of hydrazine hydrate was added, and the mixture refluxed for a half hour. The solution was made acid to Congo red by the addition of hydrochloric acid. After filtration of the precipitated phthal-hydrazide, the solution was concentrated to a small volume, filtered again, and neutralized to methyl red with morpholine. Ten volumes of absolute alcohol was added slowly with stirring and the glycyl-glycyl-glycine separated in crystals. Yield: 0.5 gram (68% of theory).

EXAMPLE III

*Preparation of glycyl-tryptophane*

(A) *Preparation of the phthalyl-glycyl-tryptophane intermediate.* — Two and four-hundredths grams of l-tryptophane and 1.85 grams of sodium bicarbonate were suspended in 50 cc. of water. The suspension was cooled and 2.33 grams of phthalyl-glycyl chloride in benzene was added slowly. In view of the sparing solubility of tryptophane in sodium bicarbonate solution, the slow addition of the acid chloride was especially important. The phthalyl-glycyl-tryptophane was recovered by acidification of the aqueous layer and recrystallization from alcohol, and was found to have a melting point of 210°–211° C. and a nitrogen content of 10.5% (theoretical nitrogen content 10.76%).

(B) *Cleavage of phthalyl - glycyl - tryptophane.*—One and twenty-six hundredths grams of phthalyl-glycyl-tryptophane, prepared as described above, was suspended in 25 cc. of boiling water, 0.17 gram of hydrazine hydrate was added, and the mixture refluxed for a half hour. The reaction mixture was then acidified to Congo red with hydrochloric acid and the precipitated phthalhydrazide filtered off. The filtrate was concentrated to a small volume, filtered again, and neutralized to methyl red with morpholine. Ten volumes of absolute alcohol were added. The glycyl-l-tryptophane separated in crystals. A yield of 0.66 gram was obtained (79% of theory).

EXAMPLE IV

*Preparation of glycyl-dl-alanine*

(A) *Preparation of the phthalyl-glycyl-dl-alanine intermediate.*—Three and six-tenths grams of dl-alanine and 7.5 grams of sodium bicarbonate were suspended in 75 cc. of water. The suspension was cooled and 8.4 grams of phthalyl-glycyl chloride added slowly. The phthalyl-glycyl-dl-alanine was recovered by acidification with hydrochloric acid and recrystallization from alcohol and then water. The product was obtained in a yield of 6.23 grams (60% of theory) and had a melting point of 221°–222° C.

(B) *Cleavage of phthalyl-glycyl-dl-alanine.*— Phthalyl-glycyl-dl-alanine was cleaved in the same manner as set forth in Examples I, II and III (part B of each), utilizing the reagents phthalyl-glycyl-dl-alanine and hydrazine hydrate in the proportion of 1 mol to 1.1 mols. The cleavage was effected by refluxing the reagents in water, and the product was recovered by acidification to remove the phthal-hydrazide followed by concentration, neutralization with morpholine, and addition of absolute alcohol to precipitate the glycyl-dl-alanine.

EXAMPLE V

*Preparation of glycyl-dl-serine*

(A) *Preparation of the phthalyl-gylcyl-dl-serine intermediate.*—One and five-hundredths grams of dl-serine and 1.85 grams of sodium bicarbonate were suspended in 25 cc. of water. The suspension was cooled and 2.33 grams of phthalyl-glycyl chloride in benzine was added slowly. After stirring for about one hour, the benzene layer was removed and the aqueous solution acidified with hydrochloric acid. On recrystallization from water, phthalyl-glycyl-dl-serine, having a melting point of 191° C., was obtained. It was found to have a nitrogen content of 9.5% (theoretrical nitrogen content, 9.57%).

(B) *Cleavage of phthalyl-glycyl-dl-serine.*— Phthalyl-glycyl-dl-serine was cleaved in the same manner as set forth in Examples I, II and III (part B of each), utilizing the reagents phthalyl-glycyl-dl-serine and hydrazine hydrate in the proportion of 1 mol to 1.1 mols. The cleavage was effected by refluxing the reagents in water and the product was recovered by acidification to remove the phthal-hydrazide followed by concentration, neutralization with morpholine, and addition of absolute alcohol to precipitate glycyl-dl-serine.

The phthalyl-glycyl chloride used in the above examples may be prepared by any of the known methods. However, it was preferred to use the following technique:

Twenty grams of phthalic anhydride and 10 grams of glycine were powdered and intimately mixed in a 500 cc. Erlenmeyer flask which was then immersed in an oil bath heated to 140° C. and maintained at that temperature. The mixture melted rapidly with effervescence and was swirled about the bottom of the flask. Phthalyl-glycine soon started to crystallize, and the heating was continued for about 5 minutes after the contents of the flask became solid. The product was recrystallized from 200 cc. of water. Yield of phthalyl-glycine 25 grams (91% of theory), melting point 191.5°–192.5° C.

Ten grams of the phthalyl-glycine and 15 to 20 cc. of thionyl chloride were refluxed together in absence of moisture until solution was complete and then for about 10 minutes more. One hundred cc. of petroleum ether (B. P. 88°–98° C.) was added and the mixture heated until all but a very small amount of material was dissolved. The solution was then filtered, to remove the insoluble material and, on cooling the filtrate, phthalyl-glycyl chloride separated in the form of needles melting at 84°–85° C. The yield was 9.0 grams. On concentrating the mother liquors, there was recovered 0.75 gram more of material of equal purity, bringing the yield up to 88% of the theoretical.

Other phthalyl amino acid halides can be prepared in the same general manner.

The process of this invention is of wide versatility and can be used to prepare innumerable peptides derived from many different amino acids. For example, the phthalyl amino acid chloride reactant may be any one of the following— phthalyl-glycyl chloride, phthalyl alanyl chloride, phthalyl valyl chloride, phthalyl leucyl chloride, phthalyl isoleucyl chloride, phthalyl norleucyl chloride, diphthalyl lysyl chloride, phthalyl phenylalanyl chloride, diphthalyl cystyl chloride, phthalyl methionyl chloride, phthalyl tryptophanyl chloride, phthalyl anthranilyl chloride, para-phthalimido benzoyl chloride, phthalimido naphthoyl chloride, beta-phthalimido propionyl chloride, gamma-phthalimido butyryl chloride, beta-phthalimido butyryl chloride, and so forth. In general, the phthalyl amino acid chlorides have been found to give the best results, but, if desired, other acid halides can be used. Thus, one can employ any of the aforementioned compounds in the form of their corresponding acid bromides or acid iodides. For example, instead of phthalyl-glycyl chloride, one could use phthalyl-glycyl bromide or phthalyl-glycyl iodide.

The phthalyl amino acid halide can be reacted with a great variety of amino acids or peptides. Thus, the following amino acids or peptides can be used: glycine, alanine, valine, leucine, isoleucine, norleucine, lysine, serine, threonine, phenylalanine, tyrosine, aspartic acid, cystine, methionine, arginine, tryptophane, histidine, proline, hydroxyproline, iodogorgoic acid, thyroxine, glycyl-glycine, glycyl-alanine, glycyl-valine, glycyl-leucine, glycyl-isoleucine, glycyl-norleucine, glycyl-lysine, glycyl-serine, glycyl-threonine, glycyl-phenylalanine, glycyl-tyrosine, glycyl-aspartic acid, glycyl-cystine, glycyl-methionine, glycyl-arginine, glycyl-tryptophane, glycyl-histidine, glycyl-proline, glycyl-hydroxyproline, glycyl-iodogorgoic acid, glycyl-thyroxine, alanyl-glycine, alanyl-alanine, alanyl-valine, alanyl-leucine, alanyl-isoleucine, alanyl-norleucine, alanyl-lysine, alanyl-serine, alanyl-threonine, alanyl-phenylalanine, alanyl-tyrosine, alanyl-aspartic acid, alanyl-cystine, alanyl-methionine, alanyl-arginine, alanyl-tryptophane, alanyl-histidine, alanyl-proline, alanyl-hydroxyproline, alanyl-iodogorgoic acid, alanyl-thyroxine, glycyl-glycyl-glycine, glycyl-glycyl-alanine, glycyl-glycyl-valine, glycyl-glycyl-leucine, glycyl-glycyl-isoleucine, glycyl-glycyl-norleucine, glycyl-glycyl-lysine, glycyl-glycyl-serine, glycyl-glycyl-threonine, glycyl-glycyl-phenylalanine, glycyl-glycyl-tyrosine, glycyl-glycyl-aspartic acid, glycyl-glycyl-cystine, glycyl-glycyl-methionine, glycyl-glycyl-arginine, glycyl-glycyl-tryptophane, glycyl-glycyl-histidine, glycyl-glycyl-proline, glycyl-glycyl-hydroxyproline, glycyl-glycyl-iodogorgoic acid, glycyl-glycyl-thyroxine, glycyl-glycyl-glycyl-glycine, and so forth.

As set forth above, the first step in the process involves the reaction of a phthalyl amino acid halide with an amino acid or a peptide. In this reaction, the phthalyl amino acid halide and the amino acid, or peptide, are employed in approximately equimolar proportions at a temperature from about 0° to about 25° C., not, however, substantially exceeding the latter temperature. Higher temperatures tend to favor hydrolysis of the acid chloride to the detriment of the desired coupling reaction.

The acid halide and amino acid, or peptide, can be reacted in the presence of water but in the absence of any organic solvent. However, it is preferred to dissolve the acid chloride in benzene, chloroform or other inert organic solvent and react this solution with the aqueous suspension of the other reagent. In this manner there is reaction between the two liquid phases which proceeds at a higher rate than a reaction between a liquid and a solid phase. The amount of water used is not critical, a sufficient amount usually being employed to dissolve the amino acid or peptide, or at least to form a thin suspension thereof. Likewise, the amount of inert organic solvent is not critical, generally sufficient solvent being used to form a solution of the desired quantity of acid halide.

It is necessary to have present in the reaction mixture a buffer such as sodium bicarbonate, potassium bicarbonate, potassium sulphite, sodium sulphite, pyridine, and so forth. This buffer should be present in quantity sufficient to neutralize the hydrogen chloride and the pythalyl peptide formed in the reaction. Thus, at least 2 mols of sodium bicarbonate are required per mol of acid chloride. Preferably, somewhat of an excess is used, i. e., 2.0 to 2.5 mols. Besides the above mentioned buffers, any other compound can be used which will maintain the reaction mixture approximately neutral or weakly alkaline and which has sufficient reserve alkalinity, and which is present in sufficient quantity to neutralize the hydrogen chloride and phthalyl peptide formed.

The phthalyl peptide is recovered from the reaction mixture by simply removing the organic solvent layer and acidifying the aqueous solution with hydrochloric acid, sulphuric acid, or other mineral acid. The salt of the phthalyl peptide (sodium phthalyl-glycyl-glycinate, in Example I) is thereby converted into the acid (phthalyl-glycyl-glycine, in Example I) which is insoluble in water and which precipitates out of solution. If a purer product is desired, phthalyl peptide may be recrystallized. This step may, of course, be eliminated if a high grade of purity is not desired.

In the cleavage step, the phthalyl peptide is reacted with hydrazine in the presence of water. The temperature used is about 100° C., as at that temperature the reaction can be refluxed to get complete reaction, and at the same time loss of hydrazine is prevented. This refluxing should be accomplished in about 15 minutes to about one half hour. Prolonged heating may cause formation of diketo-piperazines. The amount of water used is not critical, sufficient water generally being used to dissolve the phthalyl peptide; however, an excess over this amount will not be harmful. The hydrazine is employed in equimolar proportion with respect to the phthalyl peptide, and preferably an excess, 1.1 to 2 mols, is employed. Hydrazine hydrate is a convenient source of hydrazine and can be used directly in the process. If hydrazine or hydrazine hydrate is not available, one can use mineral acid salts of hydrazine (hydrazine hydrochloride, hydrazine sulphate, and so forth), together with the equivalent amount of base (sodium or potassium hydroxide) required to release the hydrazine from the salt. The peptide is recovered by acidifying the reaction product with hydrochloric acid, sulphuric acid or other mineral acid, which results in the precipitation of phthalhydrazine, the by-product. The aqueous solution is then concentrated and filtered again to remove further amounts of phthalhydrazine. Morpholine is then added to methyl red endpoint and absolute alcohol added to precipitate the peptide. The purpose of the morpholine addition is to form a salt of morpholine with the hydrogen chloride present in solution and/or attached to the amino group of the peptide as a hydrochloride salt. This morpholine hydrochloride is very soluble and will not precipitate when the alcohol is added, thus allowing complete separation of the components of the solution. Instead of morpholine, one can use pyridine, aniline or other nitrogenous bases whose hydrochlorides are soluble in alcohol.

The term "amino acid" as used herein means a carboxylic acid which contains an amino group ($-NH_2$) attached to a carbon atom in the acid nucleus.

The term "peptide" as used herein means the combination of two or more amino acids, the amino group of one acid being united with the carboxyl group of another by formation of an amide group.

The term "phthalyl amino acid chloride" as used herein means a derivative of an amino acid (as defined above) in which the amino group ($NH_2$) is replaced by the phthalimido group

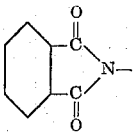

and the carboxylic group is replaced by the acid chloride group

The phthalyl amino acid chlorides can also be referred to as phthalimido acyl chlorides. Of course, the phthalyl amino acid halides are of the same type wherein the chlorine group of the phthalyl amino acid chloride may be replaced by iodine or bromine.

The term "phthalyl peptide" as used herein means a derivative of a peptide (as defined above) wherein the amino group ($NH_2$) is replaced by the phthalimido group.

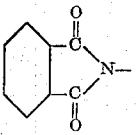

Having thus described the invention, I claim:

1. A process comprising reacting a phthalyl amino acid halide with a member selected from the class consisting of amino acids and peptides in the presence of a neutral to weakly alkaline buffer to produce a phthalyl peptide, and then refluxing the phthalyl peptide so formed with water and a member selected from the class consisting of hydrazine, hydrazine hydrate, and the mineral acid salts of hydrazine to produce a peptide.

2. A process comprising reacting a phthalyl amino acid halide with an amino acid in the presence of a neutral to weakly alkaline buffer to produce a phthalyl peptide, and then refluxing the phthalyl peptide so formed with water and a member selected from the class consisting of hydrazine, hydrazine hydrate, and the mineral acid salts of hydrazine to produce a peptide.

3. A process comprising reacting a phthalyl amino acid halide with a peptide in the presence of a neutral to weakly alkaline buffer to produce a phthalyl peptide containing an amino acid unit additional to those contained in said peptide, and then refluxing the phthalyl peptide so formed with water and a member selected from the class consisting of hydrazine, hydrazine hydrate, and the mineral acid salts of hydrazine to produce a peptide.

4. A process comprising reacting a phthalyl amino acid halide with a member selected from the class consisting of amino acids and peptides in the presence of sodium bicarbonate to produce a phthalyl peptide, and then refluxing the phthalyl peptide so formed with water and a member selected from the class consisting of hydrazine, hydrazine hydrate, and the mineral acid salts of hydrazine to produce a peptide.

5. A process comprising reacting a phthalyl amino acid halide with a member selected from the class consisting of amino acids and peptides in the presence of a neutral to weakly alkaline buffer to produce a phthalyl peptide, and then refluxing the phthalyl peptide so formed with water and hydrazine to produce a peptide.

6. A process comprising reacting a phthalyl amino acid halide with a member selected from the class consisting of amino acids and peptides in an aqueous medium containing a neutral to weakly alkaline buffer to produce a phthalyl peptide, and then refluxing the phthalyl peptide so formed with water and a member selected from the class consisting of hydrazine, hydrazine hydrate, and the mineral acid salts of hydrazine to produce a peptide.

7. A process comprising reacting a phthalyl amino acid halide with a member selected from the class consisting of amino acids and peptides in an aqueous medium containing a neutral to weakly alkaline buffer at a temperature not substantially in excess of about 25° C. to produce a phthalyl peptide, and then refluxing the phthalyl peptide so formed with water and a member selected from the class consisting of hydrazine, hydrazine hydrate, and the mineral acid salts of hydrazine to produce a peptide.

8. A process comprising reacting a phthalyl amino acid halide with a member selected from the class consisting of amino acids and peptides in the presence of a neutral to weakly alkaline buffer to produce a phthalyl peptide, and then refluxing the phthalyl peptide so formed with water and a member selected from the class consisting of hydrazine, hydrazine hydrate, and the mineral acid salts of hydrazine for about 15 to 30 minutes to produce a peptide.

9. A process comprising reacting a phthalyl amino acid chloride with a member selected from the class consisting of amino acids and peptides in the presence of a neutral to weakly alkaline buffer to produce a phthalyl peptide, and then refluxing the phthalyl peptide so formed with water and a member selected from the class consisting of hydrazine, hydrazine hydrate, and the mineral acid salts of hydrazine to produce a peptide.

10. A process comprising reacting a phthalyl amino acid halide with a member selected from the class consisting of amino acids and peptides in the presence of a neutral to weakly alkaline buffer to produce a phthalyl peptide, and then heating the phthalyl peptide so formed with water and a member selected from the class consisting of hydrazine, hydrazine hydrate, and the mineral acid salts of hydrazine at a temperature of about 100° C. to produce a peptide.

11. A process of preparing glycyl-glycine comprising reacting phthalyl-glycyl chloride with glycine in the presence of sodium bicarbonate and refluxing the phthalyl-glycyl-glycine thus formed with water and hydrazine to produce glycyl-glycine.

12. A process of preparing glycyl-glycyl-glycine comprising reacting phthalyl-glycyl chloride with glycyl-glycine in the presence of sodium bicarbonate and refluxing the phthalyl-glycyl-glycyl-glycine thus formed with water and hydrazine to produce glycyl-glycyl-glycine.

13. A process for preparing glycyl-tryptophane comprising reacting phthalyl-glycyl chloride with tryptophane in the presence of sodium bicarbonate and refluxing the phthalyl-glycyl-tryptophane thus formed with water and hydrazine to produce glycyl-tryptophane.

OLIVER H. EMERSON.

REFERENCES CITED

The following references are of record in the file of this patent:

UNITED STATES PATENTS

| Number | Name | Date |
| --- | --- | --- |
| 2,184,279 | Christiansen | Dec. 26, 1939 |

OTHER REFERENCES

Sidgwick: "The Organic Chemistry of Nitrogen," Oxford Univ. Press (London) (1937), pp. 113 to 116 and 371, 126 to 130.